US012797664B2

(12) United States Patent
Chang

(10) Patent No.: US 12,797,664 B2
(45) Date of Patent: Nov. 17, 2026

(54) FIREFIGHTING SYSTEM

(71) Applicant: CHUAN YEN TECH CO., LTD., New Taipei City (TW)

(72) Inventor: Wen-Chun Chang, New Taipei City (TW)

(73) Assignee: CHUAN YEN TECH CO., LTD., New Taipei City (TW)

( * ) Notice: Subject to any disclaimer, the term of this patent is extended or adjusted under 35 U.S.C. 154(b) by 570 days.

(21) Appl. No.: 17/856,404

(22) Filed: Jul. 1, 2022

(65) Prior Publication Data

US 2024/0001186 A1 Jan. 4, 2024

(51) Int. Cl.
*A62C 37/40* (2006.01)
*A62C 3/16* (2006.01)

(52) U.S. Cl.
CPC ................ *A62C 37/40* (2013.01); *A62C 3/16* (2013.01)

(58) Field of Classification Search
CPC .. A62C 3/02; A62C 3/16; A62C 31/02; A62C 31/28; A62C 35/58; A62C 35/60; A62C 35/605; A62C 37/36; A62C 37/40
USPC ........................................................... 169/61
See application file for complete search history.

(56) References Cited

U.S. PATENT DOCUMENTS

| | | | | |
|---|---|---|---|---|
| 5,654,684 A * | 8/1997 | Boyden | G08B 25/08 340/288 |
| 2019/0054333 A1 * | 2/2019 | McNamara | A62C 35/023 |
| 2022/0152644 A1 * | 5/2022 | Zimmerman | B05B 16/40 |

FOREIGN PATENT DOCUMENTS

| | | | | |
|---|---|---|---|---|
| CN | 208969805 U | | 6/2019 | |
| CN | 108905017 A | | 11/2020 | |
| CN | 112370702 A | | 2/2021 | |
| CN | 112370703 A | | 2/2021 | |
| CN | 112972934 A | | 6/2021 | |
| CN | 114191743 A | | 3/2022 | |
| CN | 114470563 A | * | 5/2022 | F24F 7/08 |
| CN | 217661179 U | | 10/2022 | |
| KR | 20020082331 A | | 10/2002 | |
| KR | 102352591 B1 | * | 1/2022 | A62C 3/00 |
| KR | 20220086725 A | * | 6/2022 | A62C 3/06 |
| KR | 20230025546 A | * | 2/2023 | A62C 31/02 |
| TW | M631902 U | | 9/2022 | |
| WO | WO-2022074484 A1 | * | 4/2022 | A62C 3/06 |

OTHER PUBLICATIONS

English language translation of KR-20230025546-A (Year: 2023).*
English language translation of CN-114470563-A (Year: 2022).*
Office Action dated Oct. 6, 2022 of the corresponding Taiwan patent application No. 111118028.

* cited by examiner

*Primary Examiner* — Darren W Gorman
(74) *Attorney, Agent, or Firm* — HDLS IPR SERVICES; Chun-Ming Shih

(57) ABSTRACT

A firefighting system includes a fluid unit, a sensing unit, and a control unit. The fluid unit is arranged adjacent to a lower part of a parking area. The sensing unit senses an ambient temperature of the parking area and generates a temperature information. The control unit is electrically connected with the sensing unit and the fluid unit. When the temperature information is greater than or equal to a first threshold temperature, the control unit controls the fluid unit to output a fluid to the lower part of the parking area.

6 Claims, 5 Drawing Sheets

FIREFIGHTING SYSTEM

BACKGROUND

Technical Field

The present disclosure is related to a firefighting system, in particular to a firefighting system for a lower part of a parking area.

Description of Related Art

In related art firefighting facilities, firefighting facilities are generally arranged on a ceiling of an indoor space, which not only has a large-scale water spraying effect, but also may bury relevant pipelines for transmitting water and electricity in the top decoration of the indoor space. Besides, it is not only aesthetic but also saves space. Especially for a densely distributed parking spaces that are usually arranged in underground spaces, the plan of spraying water in the large-scale from top to bottom may save a configuration cost of the overall firefighting facilities.

In view of increasingly popular green energy transportation methods in recent years, electric vehicles without air pollution emissions are becoming more and more popular. However, a power source of the electric vehicle comes from a lithium battery array, and the lithium battery array is usually arranged in a chassis part of the electric vehicles. When the electric vehicle catches fire, the lithium battery array with the greatest risk may not be directly extinguished or cooled by the firefighting facilities on the ceiling, it may cause safety problems.

Therefore, how to design a firefighting system for enhancing a fire safety of a parking area for electric vehicles is an important subject studied by the inventor of the present disclosure.

SUMMARY

One object of the present disclosure is to provide a firefighting system for extinguishing or cooling a lower part of a parking area, especially for electric vehicles with lithium battery arrays arranged in a chassis part of the electric vehicles, thereby enhancing a fire safety of the parking area.

In order to achieve the above object of the present disclosure, the firefighting system includes a fluid unit, a sensing unit, and a control unit. The fluid unit is arranged adjacent to a lower part of a parking area. The sensing unit senses an ambient temperature of the parking area and generates a temperature information. The control unit is electrically connected with the sensing unit and the fluid unit. When the temperature information is greater than or equal to a first threshold temperature, the control unit controls the fluid unit to output a fluid to the lower part of the parking area.

In some embodiments, when the temperature information is greater than or equal to a second threshold temperature, and less than or equal to the first threshold temperature, the control unit outputs a warning message.

In some embodiments, when the temperature information is greater than or equal to the first threshold temperature, the control unit outputs a warning message, and controls the fluid unit to output the fluid.

In some embodiments, the fluid unit includes a spray nozzle facing the lower part of the parking area, and the spray nozzle outputs the fluid along or upward from a bottom surface of the lower part.

In some embodiments, the fluid unit includes a solenoid valve that is electrically connected to the control unit.

In some embodiments, the control unit includes a communication element, and the communication element transmits the temperature information to a cloud server.

In some embodiments, the control unit includes a speaker, and the speaker generates a warning sound.

In some embodiments, the control unit includes a warning light, and the warning light generates a warning light effect.

In some embodiments, the control unit includes a control interface that is electrically connected to the fluid unit and the sensing unit.

In some embodiments, the firefighting system further includes a water mist unit that is electrically connected to the control unit, and the water mist unit is arranged on an upper part of the parking area.

In summary, in the firefighting system of the present disclosure, when the sensing unit detects that the ambient temperature is abnormal (for example, the temperature information is greater than or equal to the first threshold temperature), the control unit controls the fluid unit arranged in the lower part of the parking area to output the fluid to the lower part of the parking area. Especially for electric vehicles with lithium battery arrays arranged in a chassis part of the electric vehicles, the fluid unit directly extinguishes or cools a bottom of the electric vehicle.

Therefore, the firefighting system of the present disclosure achieves a purpose of enhancing a fire safety of the parking area.

In order to further understand the techniques, means, and effects of the present disclosure for achieving the intended purpose. Please refer to the following detailed description and drawings of the present disclosure. The drawings are provided for reference and description only, and are not intended to limit the present disclosure.

DETAILED DESCRIPTION

Figure 1:
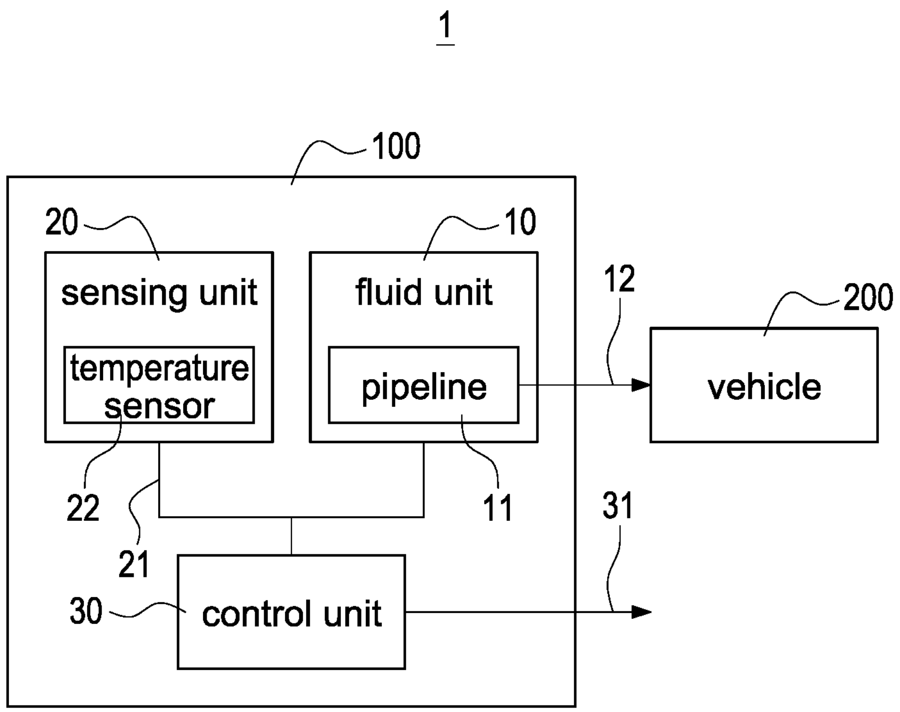
FIG. 1 is a system architecture diagram of a first embodiment of a firefighting system of a present disclosure.

The following are specific examples to illustrate some implementations of the present disclosure. A person skilled in the art may understand the advantages and effects of the present disclosure from the content disclosed in this specification. The present disclosure may be implemented or applied through other different specific embodiments, and various details in this specification may also be based on different viewpoints and applications, and various modifications and changes may be made without departing from the concept of the present disclosure.

It should be understood that the structures, the proportions, the sizes, the number of components, and the like in the drawings are only used to cope with the contents disclosed in the specification for understanding and reading by those skilled in the art, and it is not intended to limit the conditions that may be implemented in the present disclosure, and thus is not technically significant. Any modification of the structure, the change of the proportional relationship, or the adjustment of the size, should be within the scope of the technical contents disclosed by the present disclosure without affecting the effects and the achievable effects of the present disclosure.

The technical content and detailed description of the present disclosure will be described below in conjunction with the drawings.

FIG. 1 is a system architecture diagram of a first embodiment of a firefighting system of a present disclosure.

As shown in FIG. 1, the firefighting system 1 includes a fluid unit 10, a sensing unit 20, and a control unit 30.

The fluid unit 10 is arranged adjacent to a lower part of a parking area 100. In some embodiments, the fluid unit 10 includes a pipeline 11 carrying a fluid 12 such that the fluid 12 may flow in the pipeline 11 and be delivered to a location or area requiring application of the fluid 12 for firefighting purposes, such as the lower part of the parking area 100 corresponding to a bottom of a vehicle 200, but there is not limited thereto.

In some embodiments, the fluid 12 may include water, potassium carbonate, liquid carbon dioxide, chemical foam fire suppressant, hydrofluorocarbons (HFC), halogenated alkanes (Halon), 3M's Novec fire suppressant, etc., but there is not limited thereto.

In some embodiments, further, some common materials of the pipeline 11 include polyvinylchloride (PVC), electrical metallic tubing (EMT), chlorinated polyvinyl chloride (CPVC), rigid steel galvanized (RSG), cast iron pipes, steel pipes, stainless steel pipes, copper pipes, brass pipes, bronze pipes, etc., some specifications of the pipeline 11 are usually in accordance with the standards of the American nation standard institute (ANSI) or the standards of the national standards of the Republic of China (CNS). The piping 11 is made of piping materials that have corrosion resistance and heat resistance strength and comply with regulations. The erection method of the pipeline 11 includes open pipe or blind pipe, and arranging methods of the pipeline 11 includes tree piping, looped piping, and gridded piping, etc., but there is not limited thereto.

In some embodiments, further, the tree piping extends from a main pipe to each manifold to supply water to a spray nozzle, which is a conventional piping method. The main pipe of the looped piping forms a loop, and each manifold is extended from the main pipe to supply water to the spray nozzle. The gridded piping forms a grid with the main pipe, and the extended manifolds are also connected to each other to supply water to the spray nozzle. Because the grid piping has the best water conservancy conditions, the water pressure in the pipeline 11 may be reduced, but there is not limited thereto.

The sensing unit 20 senses an ambient temperature of the parking area 100 and generates a temperature information 21. In some embodiments, the sensing unit 20 includes a temperature sensor 22, and the temperature sensor 22 may include a thermocouple, a diode, a thermistor, a resistance temperature detector (RTD), an IC temperature sensor, optical temperature sensors, infrared sensors, microwave sensors, etc., but there is not limited thereto.

The control unit 30 is electrically connected with the sensing unit 20 and the fluid unit 10. When the temperature information 21 is greater than or equal to a first threshold temperature, the control unit 30 controls the fluid unit 10 to output a fluid 12 to the lower part of the parking area 100. In some embodiments, the control unit 30 may include one of a microcontroller (MCU), a microprocessor (MPU), a central processing unit (CPU), an application specific integrated circuit (ASIC), digital signal processor (DSP), graphic processing unit (GPU), field programmable gate array (FPGA), and a system-on-chip (SoC). The MCU may also include a circuit board based on the Arduino machine code architecture, such as a printed circuit board (PCB). The SoC may be a Raspberry Pi and its model number may be Type 1A, Type 1A+, Type 1B, Type 1B+, Type 2B, Type 3B, Type 3B+, Type 3A+, or Type 4B, etc., but there is not limited thereto.

In some embodiments, the first threshold temperature is pre-stored in the control unit 30. When the temperature information 21 is greater than or equal to the first threshold temperature, the control unit 30 outputs a warning message 31, and controls the fluid unit 10 to output the fluid 12.

In some embodiments, further, the first threshold temperature and the second threshold temperature are both pre-stored in the control unit 30, and the second threshold temperature is smaller than the first threshold temperature. When the temperature information 21 is greater than or equal to the second threshold temperature and less than or equal to the first threshold temperature, the control unit 30 outputs a warning message 31.

Therefore, in the fire firefighting system 1 of the present disclosure, when the sensing unit detects an abnormality in the ambient temperature or the bottom of the vehicle 200 (for example, the temperature information 21 is greater than or equal to the first threshold temperature), the control unit 30 determines that a fire accident has occurred in a specific area (for example, based on temperature, flame or smoke, etc.). The control unit 30 controls the fluid unit 10 arranged in the lower part of the parking area 100 to output the fluid 12 to the lower part of the parking area 100, especially for electric vehicles in which the lithium battery array is arranged at the chassis part of the vehicles. The fluid unit 10 directly extinguishes or cools the bottom of the electric vehicles, so as to enhance a fire safety of the parking area 100.

Figure 2:
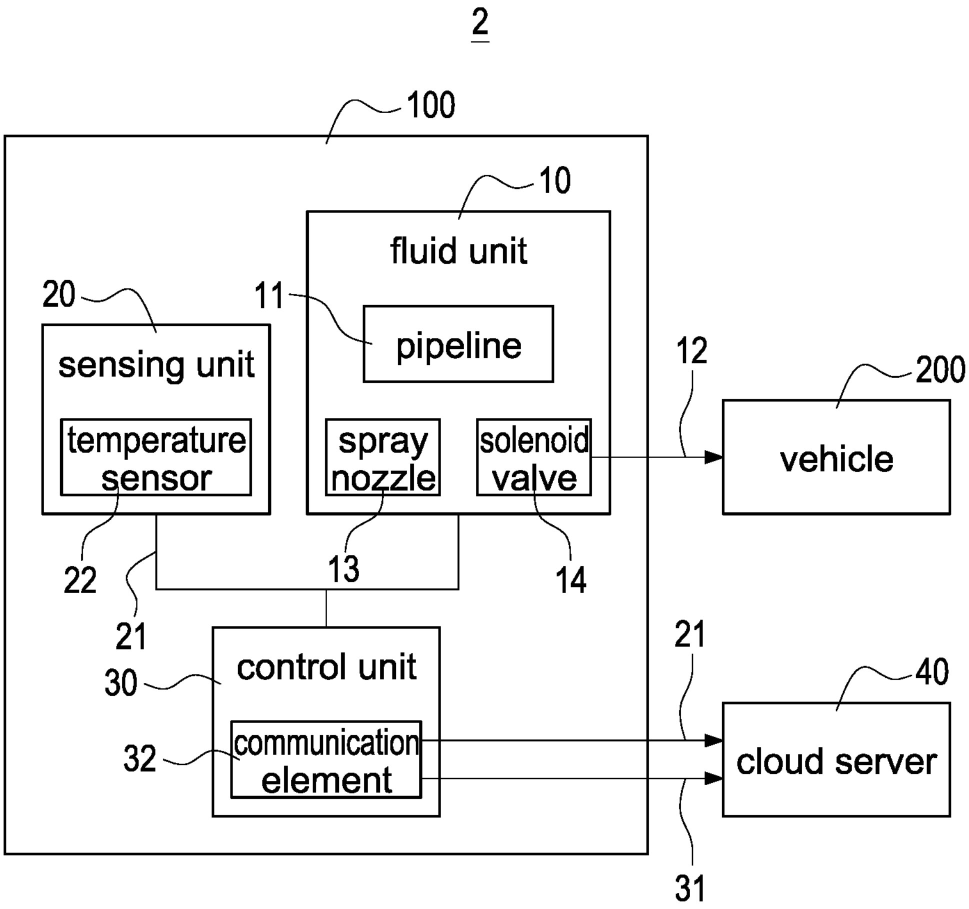
FIG. 2 is a system architecture diagram of a second embodiment of the firefighting system of the present disclosure.
Figure 3:
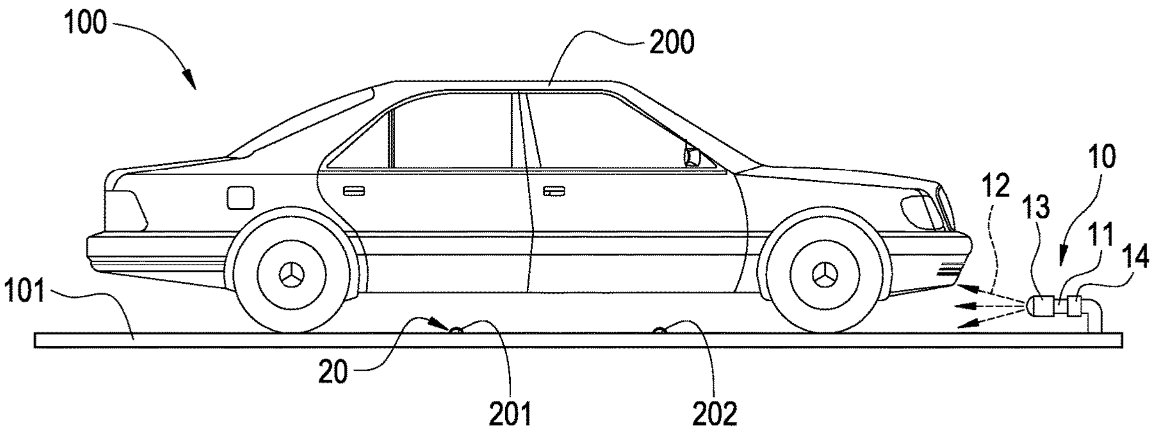
FIG. 3 and FIG. 4 are schematic diagrams of a first configuration of the firefighting system of the present disclosure.
Figure 4:
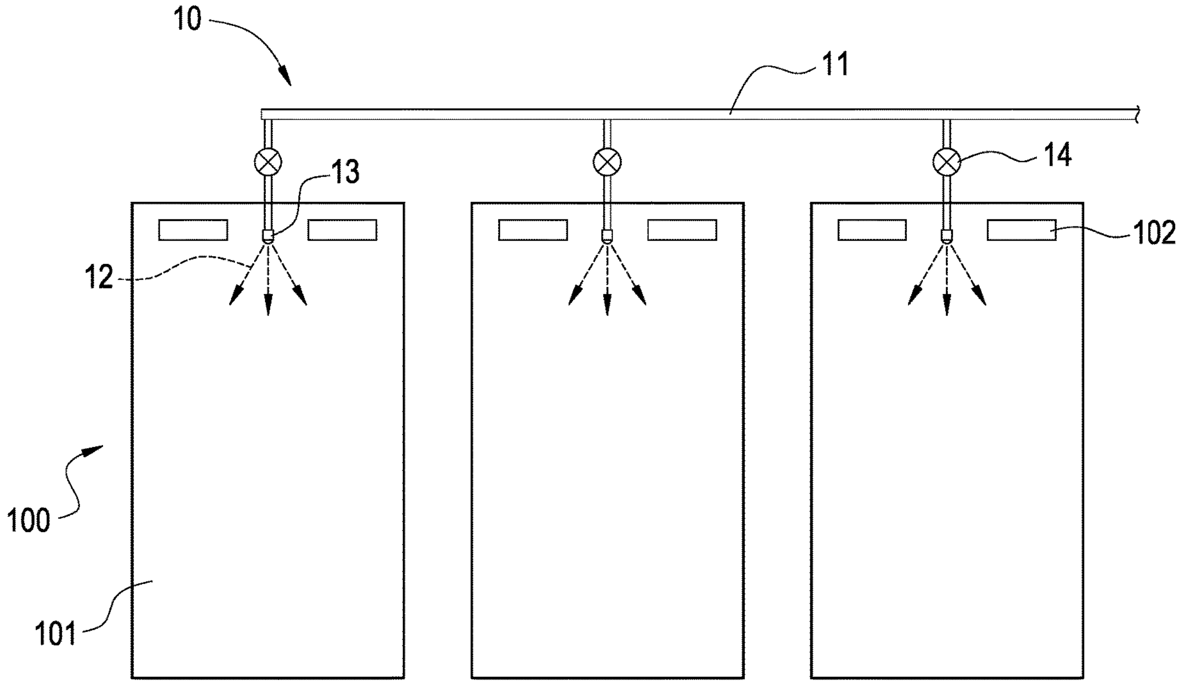

FIG. 2 is a system architecture diagram of a second embodiment of the firefighting system of the present disclosure. FIG. 3 and FIG. 4 are schematic diagrams of a first configuration of the firefighting system of the present disclosure.

As shown in FIG. 2 and FIG. 3, the firefighting system 2 of the present disclosure is similar to the firefighting system 1 of the first embodiment, except that the firefighting system 2 further includes a cloud server 40. And the fluid unit 10 further includes a spray nozzle 13 and a solenoid valve 14, the control unit 30 includes a communication element 32.

The communication element 32 transmits the temperature information 21 or the warning message 31 to the cloud server 40 for some relevant users to perform record or decision management. The transmission between the communication element 32 and the cloud server 40 may be continuous push transmission or intermittent periodic transmission, but there is not limited thereto.

In some embodiments, the sensing unit 20 may include a first sensing unit 201 and a second sensing unit 202. Further, the first sensing unit 201 senses the first ambient temperature of the parking area 100, and generates a first temperature information. The second sensing unit 202 senses the second ambient temperature of the parking area 100, and generates second temperature information. The second ambient temperature is greater than the first ambient temperature. For example, the first ambient temperature is between 30 and 60 degrees Celsius, and the second ambient temperature is between 60 and 90 degrees Celsius, but there is not limited thereto.

It is worth mentioning that the advantage of using the first sensing unit 201 and the second sensing unit 202 is that when one of the sensing units fails or detects abnormality, there is another sensing unit that may perform an emergency rescue to enhance the safety and reliability of the overall system.

In some embodiments, the communication between the communication element 32 and the cloud server 40 may be performed through a wired connection or a wireless connection. Further, the wired connection is compatible with wired protocols including USB, RJ-45, etc. The wireless connection is compatible with wireless protocols including Bluetooth, radio frequency (RF), near field communication (NFC), infrared (IR), Wi-Fi, LoRa or Zigbee, etc., but there is not limited thereto.

The spray nozzle 13 and the pipeline 11 of the fluid unit 10 communicate with each other, and are used to output the fluid 12 flowing in the pipeline 11. As shown in FIG. 3, in some embodiments, the spray nozzle 13 faces the lower part of the parking area 100. The fluid unit 10 is arranged adjacent to the front of the vehicle and output the fluid 12 along the bottom surface 101 of the lower part (for example, parallel to the ground) or upward from the bottom surface 101, but there is not limited thereto.

In some embodiments, further, the pipeline 11 of the fluid unit 10 extends upward from the bottom surface 101 of the parking area 100 and is bent into an L-shape, and the spray nozzle 13 is arranged at the extended end of the pipeline 11. The spray nozzle 13 supplies the fluid 12 to the bottom part of the corresponding vehicle 200 (for example, an electric vehicle with lithium battery array arranged at the chassis part), and the spray nozzle 13 directly extinguishes or cools the lower part of the parking area 100 and the bottom of the vehicle 200, but there is not limited thereto.

In some embodiments, further, the spray nozzle 13 is arranged in a middle gap of paired wheel rails 102 of the bottom surface 101 to output fluid 12 evenly to the vehicle 200 parked in the parking area 100, but there is not limited thereto.

The solenoid valve 14 is electrically connected to the control unit 30, and the control unit controls the solenoid valve 14 to open or close. As shown in FIG. 4, when the pipeline 11 is applied to a plurality of parking areas 100, the control unit 30 obtains the temperature information 21 of each parking area 100 through the sensing unit 20 shown in FIG. 2, the control unit 30 is used to control each solenoid valve 14 to open or close, and further control each spray nozzle 13 to output the fluid 12 for extinguishing or cooling, but there is not limited thereto.

Therefore, in the fire firefighting system 2 of the present disclosure, when the sensing unit detects an abnormality in the ambient temperature or the bottom of the vehicle 200 (for example, the temperature information 21 is greater than or equal to the first threshold temperature), the control unit 30 determines that a fire accident has occurred in a specific area (for example, based on temperature, flame or smoke, etc.). The control unit 30 controls the fluid unit 10 arranged in the lower part of the parking area 100 to output the fluid 12 to the lower part of the parking area 100, especially for electric vehicles in which the lithium battery array is arranged at the chassis part of the vehicles. The fluid unit 10 directly extinguishes or cools the bottom of the electric vehicles, so as to enhance a fire safety of the parking area 100.

In some embodiments, the control unit 30 transmits the temperature information 21 or the warning message 31 to the cloud server 40 through the communication element 32 for some relevant users to perform record or decision management. When the fire protection system 2 is applied to a plurality of parking areas 100, the control unit 30 controls whether each spray nozzle 13 outputs the fluid 12 by controlling the opening or closing of each solenoid valve 14. In this way, the purpose of accurately corresponding to the location where firefighting measures are to be applied is achieved.

Figure 5:
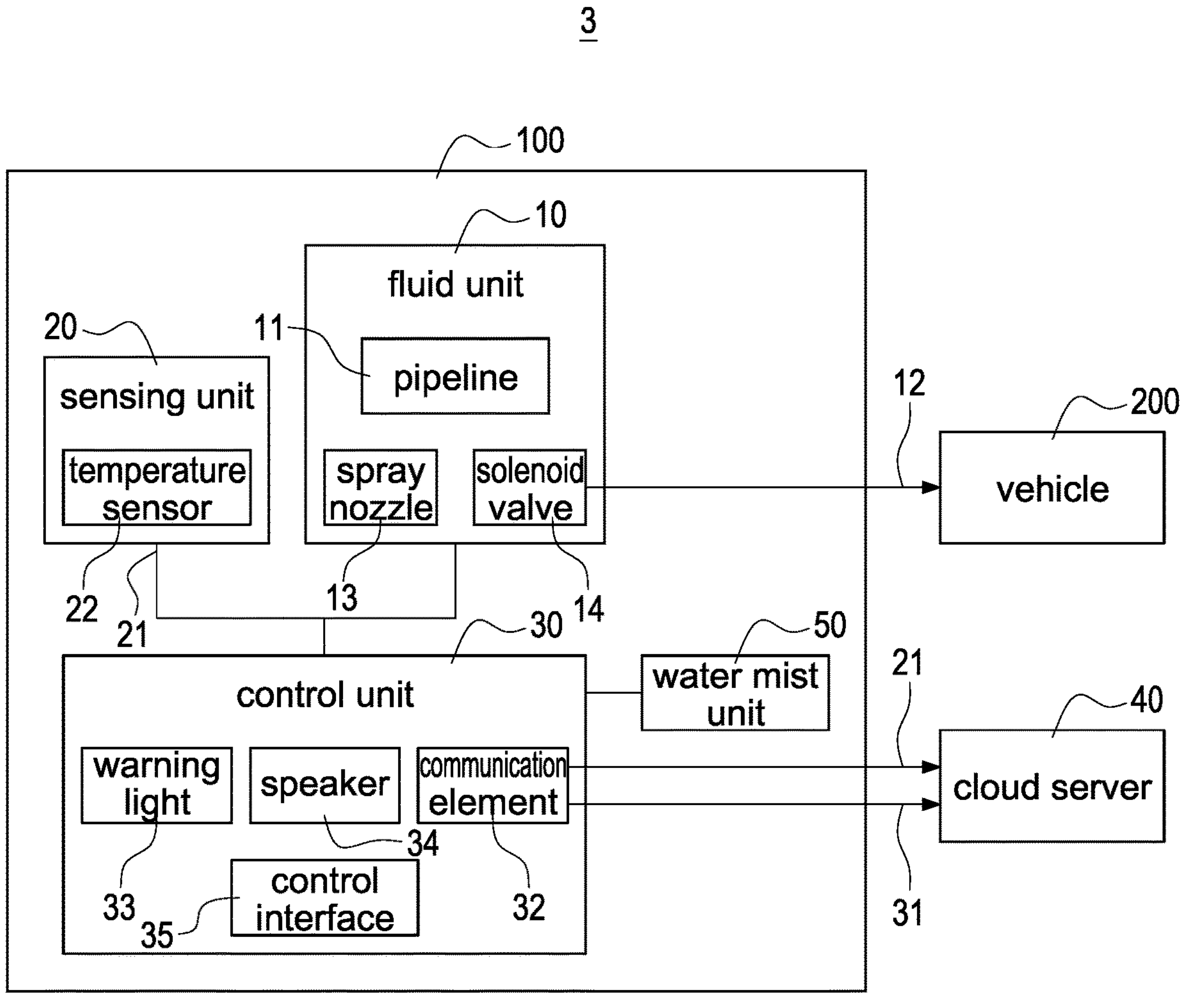
FIG. 5 is a system architecture diagram of a third embodiment of the firefighting system of the present disclosure.
Figure 6:
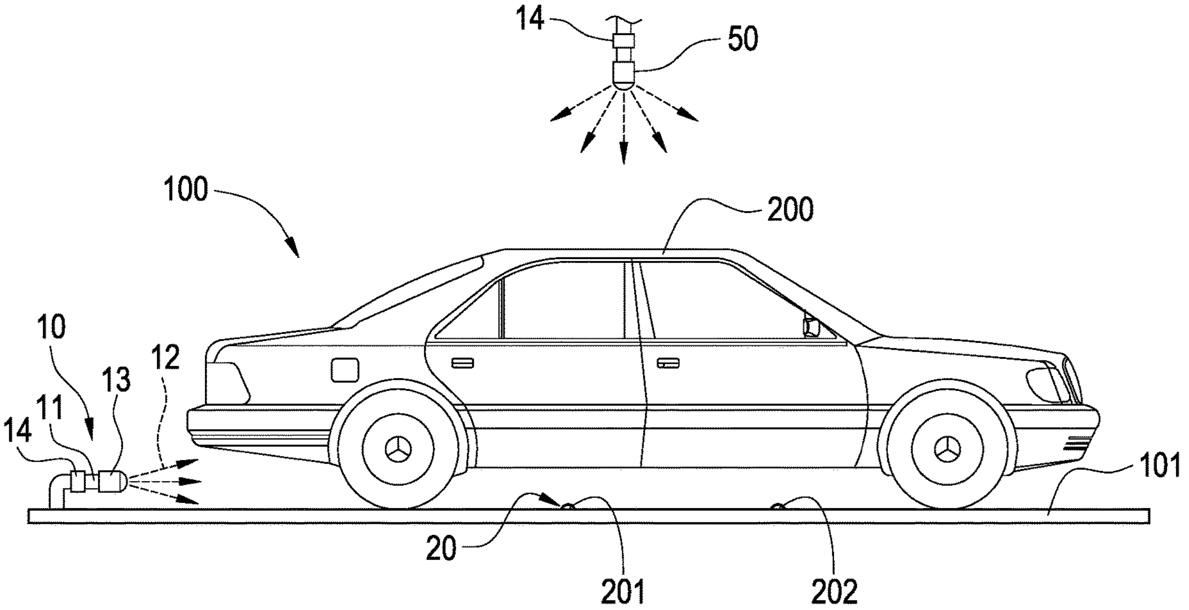
FIG. 6 is a schematic diagram of a second configuration of the firefighting system of the present disclosure.

FIG. 5 is a system architecture diagram of a third embodiment of the firefighting system of the present disclosure. FIG. 6 is a schematic diagram of a second configuration of the firefighting system of the present disclosure.

As shown in FIG. 5 and FIG. 6, the firefighting system 3 of the present disclosure is similar to the firefighting system 2 of the second embodiment, but the firefighting system 3 further includes a water mist unit 50, and the control unit 30 further includes a warning light 33, a speaker 34, and a control interface 35.

In some embodiments, when the control unit 30 outputs the warning message 31, the warning light 33 generates a warning light effect (for example, continuously on, flashes, or changes colors/icons, etc.), and the speaker 34 generates a warning sound (for example, continuous vocalization, intermittent vocalization, or changing pitch, etc.), but there is not limited thereto.

In some embodiments, the warning light 33 may include light-emitting diode (LED), and the light-emitting diode may include red light-emitting diode in a visible light range (for example, aluminum gallium arsenide (AlGaAs), arsenide Gallium phosphide (GaAsP), indium gallium aluminum phosphide (AlGaInP), gallium phosphide doped zinc oxide (GaP:ZnO)), orange light-emitting diode (for example, gallium arsenide phosphide (GaAsP), phosphide Indium gallium aluminum phosphide (AlGaInP), gallium phosphide doped X (GaP:X)), yellow light-emitting diode (for example, gallium arsenide phosphide (GaAsP), indium gallium aluminum phosphide (AlGaInP), gallium phosphide doped nitrogen (GaP:N)), green light-emitting diode (for example, indium gallium nitride (InGaN), gallium nitride (GaN), gallium phosphide (GaP), aluminum indium gallium phosphide (AlGaInP), aluminum gallium phosphide (lGaP), blue light-emitting diode (for example, zinc selenide (ZnSe), indium gallium nitride (InGaN), silicon carbide (SiC)), violet light-emitting diode (for example, indium nitride) gallium (InGaN)), and infrared light-emitting diode (for example, gallium arsenide (GaAs), aluminum gallium arsenide (AlGaAs)) or ultraviolet light-emitting diode (for example, diamond, aluminum nitride (AlN), aluminum gallium nitride (AlGaN), aluminum gallium indium nitride (AlGaInN), etc., and the light-emitting diode may also include organic light-emitting diode (OLED), but there is not limited thereto.

In some embodiments, further, the speaker 34 may include electrodynamic speakers, electromagnetic speakers, piezoelectric speakers, plasma arc speakers, etc., but there is not limited thereto.

In some embodiments, the control interface 35 is electrically connected to the fluid unit and the sensing unit 20, and the control interface 35 is used for a user to manually control the fluid unit 10 and the sensing unit 20, but there is not limited thereto.

The water mist unit 50 is electrically connected to the control unit 30, and the water mist unit 50 is arranged on an upper part of the parking area 100. In some embodiments, the water mist unit 50 is arranged on a ceiling of the parking area 100, the water mist unit 50 has a wide range of water mist effect, and may be embedded in the top decoration. Further, since the water mist unit 50 applies water to the parking area 100 from top to bottom, it may further reduce a diffusion speed of smoke and accelerate an effect of reducing ambient temperature and radiant heat, but there is not limited thereto.

In some embodiments, the fluid unit 10 may be arranged adjacent to a rear of the vehicle 200, but there is not limited thereto.

Therefore, in the fire firefighting system 3 of the present disclosure, when the sensing unit 20 detects an abnormality in the ambient temperature or the bottom of the vehicle 200 (for example, the temperature information 21 is greater than or equal to the first threshold temperature), the control unit 30 determines that a fire accident has occurred in a specific area (for example, based on temperature, flame or smoke, etc.). The control unit 30 controls the fluid unit 10 arranged in the lower part of the parking area 100 to output the fluid 12 to the lower part of the parking area 100, especially for electric vehicles in which the lithium battery array is arranged at the chassis part of the vehicles. The fluid unit 10 directly extinguishes or cools the bottom of the electric vehicles, so as to enhance a fire safety of the parking area 100.

In some embodiments, the control unit 30 transmits the temperature information 21 or the warning message 31 to the cloud server 40 through the communication element 32 for some relevant users to perform record or decision management. When the fire protection system 2 is applied to a plurality of parking areas 100, the control unit 30 controls whether each spray nozzle 13 outputs the fluid 12 by controlling the opening or closing of each solenoid valve 14. In this way, the purpose of accurately corresponding to the location where firefighting measures are to be applied is achieved.

In some embodiments, the water mist unit 50 that performs extensive water spraying on the upper part of the parking area 100 may further reduce a diffusion speed of smoke and accelerate an effect of reducing ambient temperature and radiant heat. Moreover, the warning light 33 and the speaker 34 may inform another person near the vehicle 200 of the emergency situation. The user may immediately operate the control interface 35 to manually control the fluid unit 10 and the sensing unit 20, and to avoid the misery resulted from delayed response to fire disasters, so as to enhance a fire safety of the parking area 100.

In summary, in the firefighting system of the present disclosure, when the sensing unit detects that the ambient temperature is abnormal (for example, the temperature information is greater than or equal to the first threshold temperature), the control unit controls the fluid unit arranged in the lower part of the parking area to output the fluid to the lower part of the parking area. Especially for electric vehicles with lithium battery arrays arranged in a chassis part of the electric vehicles, the fluid unit directly extinguishes or cools a bottom of the electric vehicle.

In some embodiments, the fluid unit for outputting fluid in the lower part of the parking area may be used together with the water mist unit for large-scale water spraying in the upper part of the parking area, which may further reduce the diffusion speed of smoke and accelerate the effect of reducing ambient temperature and radiant heat. Moreover, the warning light and the speaker may inform another person near the vehicle of the emergency situation. The user may immediately operate the control interface to manually control the fluid unit and the sensing unit, used to reduce the situation of regrets arising from delayed response to fire disasters In some embodiments, the control unit transmits the temperature information or the warning message to the cloud server through the communication element for some relevant users to perform record or decision management. When the fire protection system is applied to a plurality of parking areas, the control unit controls whether each spray nozzle outputs the fluid by controlling the opening or closing of each solenoid valve. In this way, the purpose of accurately corresponding to the location where firefighting measures are to be applied is achieved.

Therefore, the firefighting system of the present disclosure achieves a purpose of enhancing a fire safety of the parking area.

The above is only a detailed description and drawings of the preferred embodiments of the present disclosure, but the features of the present disclosure are not limited thereto, and are not intended to limit the present disclosure. All the scope of the present disclosure shall be subject to the scope of the following claims. The embodiments of the spirit of the present disclosure and its similar variations are intended to be included in the scope of the present disclosure. Any variation or modification that may be easily conceived by those skilled in the art in the field of the present disclosure may be covered by the following claims.

What is claimed is:

1. A firefighting system comprising:

a fluid unit arranged adjacent to a lower part of a parking area, comprising a pipeline extending upward from a bottom surface of a rear end of a parking space of the parking area and a spray nozzle arranged at an extended end of the pipeline, wherein the pipeline is bent into an L-shape at a part protruding from the bottom surface to make the spray nozzle parallel to a vehicle bottom surface;

a sensing unit configured to sense an ambient temperature of the parking area, and to generate a temperature information; and a control unit electrically connected with the sensing unit and the fluid unit;

wherein the spray nozzle faces the lower part of the parking space of the parking area, and the spray nozzle is configured to output a fluid along the bottom surface of the lower part of the parking area in a direction parallel to the vehicle bottom surface;

wherein the fluid unit is arranged outside of a front or a rear of an electric vehicle parked on the parking space of the parking area and the spray nozzle outputs the fluid from outside of the electric vehicle toward a direction of the electric vehicle;

wherein the spray nozzle is configured to spray the fluid from the front to the rear of the electric vehicle, or from the rear to the front of the vehicle, so as to evenly spray the fluid to the electric vehicle parked in the parking space of the parking area;

wherein when the temperature information is greater than or equal to a second threshold temperature, and less than a first threshold temperature, the control unit is configured to output a warning message;

wherein when the temperature information is greater than or equal to the first threshold temperature, an abnormality is detected and the control unit is configured to output the warning message, and configured to control the fluid unit to output the fluid;

wherein the second threshold temperature is smaller than the first threshold temperature;

wherein the spray nozzle is arranged in a middle gap of paired wheel rails of the bottom surface to output the fluid evenly to the vehicle parked in the parking area;

wherein the fluid is water; the fluid flows in the pipeline; an arrangement of the pipeline comprises a tree piping, a looped piping, or a gridded piping; the tree piping extends from a main pipe of the pipeline to each manifold of the pipeline to supply the fluid to the spray nozzle; the main pipe for the looped piping forms a loop, and the each manifold is extended from the main pipe to supply the fluid to the spray nozzle; the gridded piping forms a grid with the main pipe, and extended manifolds of the pipeline are connected to each other to supply the fluid to the spray nozzle;

wherein the fluid unit further comprises a solenoid valve, and the solenoid valve is electrically connected to the control unit; the control unit is used to control the solenoid valve to open or close, and further control the spray nozzle to output the fluid.

2. The firefighting system of claim 1, wherein, the control unit comprises a speaker, and the speaker is configured to generate a warning sound.

3. The firefighting system of claim 1, wherein, the control unit comprises a warning light, and the warning light is configured to generate a warning light effect.

4. The firefighting system of claim 1, wherein, the control unit comprises a control interface, and the control interface is electrically connected to the fluid unit and the sensing unit.

5. The firefighting system of claim 1, further comprising:

a water mist unit electrically connected to the control unit, and arranged on an upper part of the parking area.

6. The firefighting system of claim 1, wherein, the sensing unit comprises:

a first sensing unit configured to sense a first ambient temperature of the parking area, and configured to generate a first temperature information; and a second sensing unit configured to sense a second ambient temperature of the parking area, and configured to generate a second temperature information;

wherein, the second ambient temperature is greater than the first ambient temperature.

* * * * *